(12) United States Patent
Saito

(10) Patent No.: US 11,041,521 B2
(45) Date of Patent: Jun. 22, 2021

(54) NUT, FEED SCREW MECHANISM, AND ELECTRIC POSITION ADJUSTMENT DEVICE FOR STEERING WHEEL

(71) Applicant: NSK LTD., Tokyo (JP)

(72) Inventor: Takeshi Saito, Maebashi (JP)

(73) Assignee: NSK, LTD., Tokyo (JP)

( * ) Notice: Subject to any disclaimer, the term of this patent is extended or adjusted under 35 U.S.C. 154(b) by 0 days.

(21) Appl. No.: 16/961,315

(22) PCT Filed: Jul. 27, 2018

(86) PCT No.: PCT/JP2018/028185
§ 371 (c)(1),
(2) Date: Jul. 10, 2020

(87) PCT Pub. No.: WO2019/142378
PCT Pub. Date: Jul. 25, 2019

(65) Prior Publication Data
US 2020/0361514 A1 Nov. 19, 2020

(30) Foreign Application Priority Data

Jan. 19, 2018 (JP) .............................. JP2018-006889
Jul. 17, 2018 (JP) .............................. JP2018-133836

(51) Int. Cl.
*F16B 39/30* (2006.01)
*B62D 1/189* (2006.01)
(Continued)

(52) U.S. Cl.
CPC .............. *F16B 39/30* (2013.01); *B62D 1/181* (2013.01); *B62D 1/189* (2013.01); *F16B 37/00* (2013.01); *F16H 25/24* (2013.01)

(58) Field of Classification Search
CPC ........ B62D 5/0448; B62D 1/18; B62D 1/181; B62D 1/189; B62D 1/184; F16B 39/30; F16B 39/28
See application file for complete search history.

(56) References Cited

U.S. PATENT DOCUMENTS 4,674,931 A * 6/1987 Schwind ............... F16B 37/041
411/175
6,199,440 B1   3/2001 Greubel et al.
(Continued)

FOREIGN PATENT DOCUMENTS

JP    11-159594     6/1999
JP    2000-145917   5/2000
(Continued)

OTHER PUBLICATIONS

International Search Report for International Application No. PCT/JP2018/028185, dated Sep. 25, 2018 (1 page).

*Primary Examiner* — Nicole T Verley
(74) *Attorney, Agent, or Firm* — Hartman Global IP Law; Gary M. Hartman; Domenica N. S. Hartman

(57) ABSTRACT

The nut according to the present invention includes: a cylindrical portion having a female screw portion provided with spiral shaped thread grooves on an inner circumferential surface thereof; and a slit provided at one location in a circumferential direction of the cylindrical portion and opening to an outer circumferential surface and an inner circumferential surface of the cylindrical portion. The slit extends in an extending direction orthogonal to a direction of a lead angle in a portion of the thread grooves crossed by the slit.

9 Claims, 12 Drawing Sheets

(51) Int. Cl.
  *B62D 1/181* (2006.01)
  *F16B 37/00* (2006.01)
  *F16H 25/24* (2006.01)

(56) References Cited

U.S. PATENT DOCUMENTS

| | | | | |
|---|---|---|---|---|
| 6,786,690 | B1* | 9/2004 | Yamada | F16B 39/122 |
| | | | | 411/238 |
| 7,886,630 | B2* | 2/2011 | Tomaru | B62D 1/181 |
| | | | | 74/493 |
| 8,038,376 | B2* | 10/2011 | Jung | F16B 39/30 |
| | | | | 411/308 |
| 8,905,694 | B2* | 12/2014 | Esper | F16B 39/30 |
| | | | | 411/307 |
| 9,702,491 | B2* | 7/2017 | Breitenbach | F16B 2/08 |
| 10,060,465 | B2* | 8/2018 | Hwang | F16B 39/284 |
| 2004/0194570 | A1* | 10/2004 | Tomaru | F16C 11/0657 |
| | | | | 74/495 |
| 2008/0047382 | A1* | 2/2008 | Tomaru | F16H 25/2009 |
| | | | | 74/388 PS |
| 2008/0289076 | A1* | 11/2008 | Millward | A44B 1/30 |
| | | | | 2/69 |
| 2009/0308189 | A1* | 12/2009 | Tomaru | B62D 1/181 |
| | | | | 74/89.42 |
| 2020/0132105 | A1* | 4/2020 | Shinbutsu | F16B 35/00 |

FOREIGN PATENT DOCUMENTS

| | | |
|---|---|---|
| JP | 2010-116042 | 5/2010 |
| WO | 2003-078234 | 9/2003 |

* cited by examiner (A)

(B)

NUT, FEED SCREW MECHANISM, AND ELECTRIC POSITION ADJUSTMENT DEVICE FOR STEERING WHEEL

CROSS REFERENCE TO RELATED APPLICATIONS

This application claims the benefit of PCT/JP2018/028185 filed Jul. 27, 2018, having a priority claim to Japanese Patent Application No. 2018-006889 filed Jan. 19, 2018, and Japanese Patent Application No. 2018-133836 filed Jul. 17, 2018. The contents of these prior patent documents are incorporated herein by reference.

TECHNICAL FIELD

The present invention relates to a nut having a slit and configured so that the inner diameter is able to expand or contract, and a feed screw mechanism using the nut. In addition, the present invention relates to an electric position adjustment device for a steering wheel for adjusting a front-rear position and/or a vertical position of a steering wheel.

BACKGROUND ART

FIG. 9 illustrates an example of an electric position adjustment device for a steering wheel as described in JP 2010-116042 (A). The electric position adjustment device for a steering wheel includes a steering column 1, a steering shaft 2, and an electric actuator 3. The steering column 1 is configured by combining a front-side outer column 4 and a rear-side inner column 5 in a telescopic manner. The outer column 4 is prevented from displacing in the axial direction with respect to the vehicle body. The front end portion of the inner column 5 is slidably inserted into the inner diameter side of the rear end portion of the outer column 4.

The steering shaft 2 is configured by combining a front-side inner shaft 6 and a rear-side outer tube 7 with a spline engagement or the like so as to be able to transmit torque and to be able to expand or contract. The inner shaft 6 is rotatably supported on the inner diameter side of the outer column 4 via a bearing (not illustrated). The outer tube 7 is rotatably supported on the inner diameter side of the inner column 5 via a bearing 8. Accordingly, the steering shaft 2 is rotatably supported on the inner diameter side of the steering column 1, and the inner column 5 and the outer tube 7 may displace in the axial direction relative to the outer column 4 and the inner shaft 6. The steering wheel 9 is supported and fixed to the rear end portion of the outer tube 7.

The electric actuator 3 includes a housing 10, a feed screw mechanism 11, and an electric motor (not illustrated). The housing 10 is supported and fixed to the lower surface of the outer column 4.

The feed screw mechanism 11 has a nut 12 and a rod 13. The center axis of the feed screw mechanism 11 is arranged parallel to the center axis of the steering shaft 2 (and the steering column 1).

The nut 12 has a female screw portion 14 having a spiral thread groove on the inner circumferential surface. The nut 12 is rotatably supported in the housing 10 such that the nut 12 is not able to displace in the axial direction, and may be rotated and driven by an electric motor via a worm reducer 15.

The rod 13 has a male screw portion 16 on the outer circumferential surface of the front-side portion and is screwed with the female screw portion 14, and the rear end portion is connected to the rear-side portion of the inner column 5 via an arm portion 17.

When adjusting the front-rear position of the steering wheel 9, the rod 13 is displaced in the axial direction by driving and rotating the nut 12 via the worm reducer 15 by the electric motor. As the rod 13 displaces in the axial direction, the inner column 5 connected to the rod 13 via the arm portion 17, and the outer tube 7 supported on the inner diameter side of the inner column 5, are displaced in the same direction as the rod 13, by which the front-rear position of the steering wheel 9 is adjusted.

JP 2006-036043 (A) discloses an electric position adjustment device for a steering wheel capable of adjusting not only the front-rear position but also the vertical position of the steering wheel. In any case, in the electric position adjustment device for a steering wheel, the front-rear position or the vertical position of the steering wheel is adjusted by converting the rotation of the output shaft of the electric motor into linear motion by the feed screw mechanism. In the feed screw mechanism, unavoidable backlash exists in a screwed portion between the female screw portion of the nut and the male screw portion of the rod. When the backlash is large, there is a possibility that an unpleasant noise called a chattering will be generated at the screwed portion between the female screw portion of the nut and the male screw portion of the rod, and the steering wheel may be loose.

FIG. 10 and FIG. 11 illustrate an example of a conventional structure of a feed screw mechanism as described in WO 03/078234 (A1). The feed screw mechanism 11a includes a nut 12a, a rod 13a, and a bolt 18.

The nut 12a has a cylindrical portion 19 having a female screw portion 14a on the inner circumferential surface, a slit 20 provided in the cylindrical portion 19 so as to extend in the axial direction, and a pair of tightening holes 21a, 21b provided in portions of the cylindrical portion 19 that are aligned with each other across the slit 20 in a direction orthogonal to the extending direction (formation direction) of the slit 20.

The rod 13a has, on the outer circumferential surface, a male screw portion 16a that is screwed with the female screw portion 14a.

The bolt 18 is screwed into the pair of tightening holes 21a, 21b.

In the feed screw mechanism 11a, by adjusting the tightening amount of the bolt 18 to expand or contract the width of the slit 20, the inner diameter of the cylindrical portion 19 is expanded or contracted, and it becomes possible to suppress the backlash between the nut 12a and the rod 13a.

CITATION LIST

Patent Literature

Patent Literature 1: JP 2010-116042 (A)
Patent Literature 2: JP 2006-036043 (A)
Patent Literature 3: WO 03/078234 (A1)

SUMMARY OF THE INVENTION

Problems to be Solved by the Invention

The feed screw mechanism 11a described in WO 03/078234 (A1) has room for improvement in the following aspects. In other words, in this structure, a slit 20 is formed in the nut 12a so as to extend in an axial direction parallel to the center axis of the nut 12a, and a bolt 18 for expanding or contracting the width of the slit 20 is arranged in a direction orthogonal to the extending direction of the slit 20. On the other hand, the thread grooves of the female screw portion 14a and the thread peaks of the male screw portion 16a have a lead angle θ, and are inclined in the axial direction (vertical direction in FIG. 12A) of the bolt 18 that corresponds to the direction of expansion or contraction of the nut 12a.

Therefore, when contracting the inner diameter of the cylindrical portion 19 by increasing the amount of tightening of the bolt 18, uneven contact occurs between the thread grooves of the female screw portion 14a and the thread peaks of the male screw portion 16a as illustrated in FIG. 12A and FIG. 12B. In other words, in a portion of the engaging portion (screwed portion) of the female screw portion 14a and the male screw portion 16a on one side in the axial direction of the bolt 18 (portion on the upper side in FIG. 12A and FIG. 12B), before one side surface of the thread grooves of the female screw portion 14a (the left side surface in FIG. 12A and FIG. 12B) and one side surface of the thread peaks of the male screw portion 16a (the left side surface in FIG. 12A and FIG. 12B) come in contact, the other side surface of the thread grooves of the female screw portion 14a (the right side surface in FIG. 12A and FIG. 12B) and the other side surface of the thread peaks of the male screw portion 16a (the right side surface in FIG. 12A and FIG. 12B) come in contact. On the other hand, in a portion of the engaging portion of the female screw portion 14a and the male screw portion 16a on the other side in the axial direction of the bolt 18 (portion on the lower side in FIG. 12A and FIG. 12B), before the other side surface of the thread grooves of the female screw portion 14a and the other side surface of the thread peaks of the male screw portion 16a come in contact, the one side surface of the thread grooves of the female screw portion 14a and the one side surface of the thread peaks of the male screw portion 16a come in contact. When such uneven contact occurs, the friction acting between the thread grooves of the female screw portion 14a and the thread peaks of the male screw portion 16a increases, and gaps that are the cause of inevitable backlash increase.

In order for the female screw portion 14a and the male screw portion 16a to properly engage, when the bolt 18 is tightened, the portions of the cylindrical portion 19 of the nut 12a on the one side and on the other side in the axial direction of the bolt 18 must be made to oppose each other in the axial direction of the nut 12a. In other words, in the example in FIG. 12A and FIG. 12B, it is necessary to displace the upper side portion of the cylindrical portion 19 to the left and the lower side portion of the cylindrical portion 19 to the right. Therefore, the reaction force applied to the bolt 18 increases as the bolt 18 is tightened. Such a problem becomes particularly remarkable when the female screw portion 14a and the male screw portion 16a are multi-thread screws having a large lead (movement distance per rotation).

In the feed screw device described in WO 03/078234 (A1), even when the inner diameter of the cylindrical portion 19 is reduced by tightening the bolt 18, it is difficult to suppress the resistance to relative rotation of the male screw portion 16a with respect to the female screw portion 14a from excessively increasing due to the effect of the uneven contact caused by tightening the bolt 18 and the reaction force applied to the bolt 18, and it is difficult to suppress backlash between the female screw portion 14a and the male screw portion 16a.

In view of the circumstances described above, an object of the present invention is to achieve a structure of a nut and feed screw mechanism capable of suppressing an excessive increase in resistance to relative rotation between a nut and rod, and capable of suppressing backlash between the nut and rod.

Means for Solving the Problems

The nut according to the present invention includes:
a cylindrical portion having a female screw portion provided with spiral shaped thread grooves on an inner circumferential surface thereof; and
a slit provided at one location in a circumferential direction of the cylindrical portion and opening to an outer circumferential surface and an inner circumferential surface of the cylindrical portion; and
the slit extends in an extending direction orthogonal to a direction of a lead angle θ in a portion of the thread grooves crossed by the slit.

Both end portions in the extending direction of the slit may be configured to not open to both end surfaces in an axial direction of the cylindrical portion. Alternatively, both end portions or one end portion in the extending direction of the slit may be configured to open to the end surface in the axial direction of the cylindrical portion.

The female screw portion may be constructed by a multiple thread screw in which the number of threads is two or more. In this case, preferably the average value of the lead angle θ of the plurality of thread grooves of the female screw portion is obtained, and the slit is provided in a direction shifted by about 90° (about 85° to 95°) with respect to the magnitude of the average value. However, the female screw portion may also be constructed by a single thread screw.

A pair of relief portions that extends in directions going away from each other while going inward in a radial direction may be provided at inner end portions in the radial direction of a pair of inside surfaces of the slit facing each other.

A pair of tightening holes that extends in a direction orthogonal to the extending direction of the slit may be provided at portions on both sides of the cylindrical portion aligned with each other across the slit. In this case, preferably the pair of tightening holes is provided at the portions on the both sides of the cylindrical portion across a central position in the extending direction of the slit 20b.

The feed screw mechanism of the present invention, includes:
   a nut including a cylindrical portion having a female screw portion provided with spiral shaped thread grooves on an inner circumferential surface thereof; a slit provided at one location in a circumferential direction of the cylindrical portion and opening to an outer circumferential surface and an inner circumferential surface of the cylindrical portion; and a pair of tightening holes provided at portions on both sides of the cylindrical portion aligned with each other across the slit and extending in a direction orthogonal to an extending direction of the slit;
   a rod having a male screw portion on an outer circumferential surface thereof that screws with the female screw portion; and
   a bolt inserted though or screwed in the pair of tightening holes for expanding or contracting a gap of the slit; and
   the nut is constructed by the nut of the present invention.

Note that, in a case where the female screw portion is constructed by a multiple thread screw, the male screw portion may be constructed by a multiple thread screw.

Preferably, the bearing surface of the head portion of the bolt is a convex curved surface.

The electric position adjustment device for a steering wheel of the present invention, includes:
- an electric motor having an output shaft;
- a steering shaft with a steering wheel supported at a rear end portion thereof;
- a steering column in which the steering shaft is rotatably supported on an inner diameter side thereof; and
- a feed screw mechanism including:
  - a nut including a cylindrical portion on an inner circumferential surface having a female screw portion provided with spiral shaped thread grooves; a slit provided at one location in a circumferential direction of the cylindrical portion and opening to an outer circumferential surface and an inner circumferential surface of the cylindrical portion; a pair of tightening holes provided at portions on both sides of the cylindrical portion aligned with each other across the slit and extending in a direction orthogonal to the extending direction of the slit;
  - a rod having a male screw portion on an outer circumferential surface thereof that screws with the female screw portion; and
  - a bolt inserted though or screwed in the pair of tightening holes for expanding or contracting a gap of the slit; and
- the feed screw mechanism is constructed by the feed screw mechanism of the present invention.

The nut or the rod is supported so as to be able to be driven and rotated by the output shaft. A displacement member that is one of the nut and the rod is supported by a portion that displaces in an adjustment direction (vertical direction or front-rear direction) of the steering wheel together with the steering wheel when adjusting the position (vertical position or front-rear position) of the steering wheel, and a fixing member that is the other of the nut and the rod is supported by a portion that does not displace in the adjustment direction of the steering wheel when adjusting the position of the steering wheel.

Effect of Invention

With the nut and the feed screw mechanism of the present invention, excessive increase in the resistance to relative rotation between the nut and rod may be suppressed, as well as backlash between the nut and rod may be suppressed.

BRIEF DESCRIPTION OF THE DRAWINGS

FIG. 1A illustrates a case in which the steering wheel is at the upper end position; FIG. 1B illustrates a case in which the steering wheel is at an intermediate position; and FIG. 1C illustrates a case in which the steering wheel is the lower end position.

MODES FOR CARRYING OUT THE INVENTION

First Example

Figure 9:
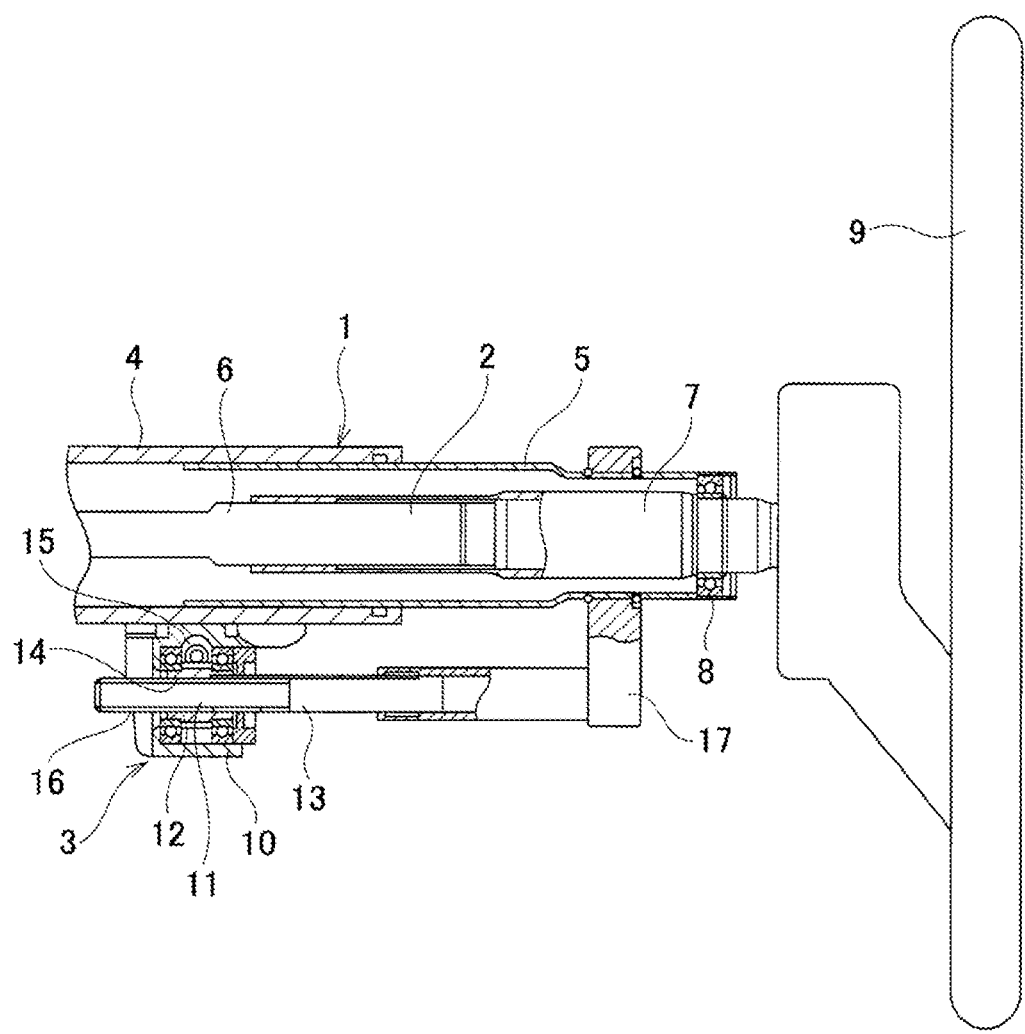
FIG. 9 is a cross-sectional view illustrating an example of a conventional electric position adjustment device for a steering wheel.
Figure 10:
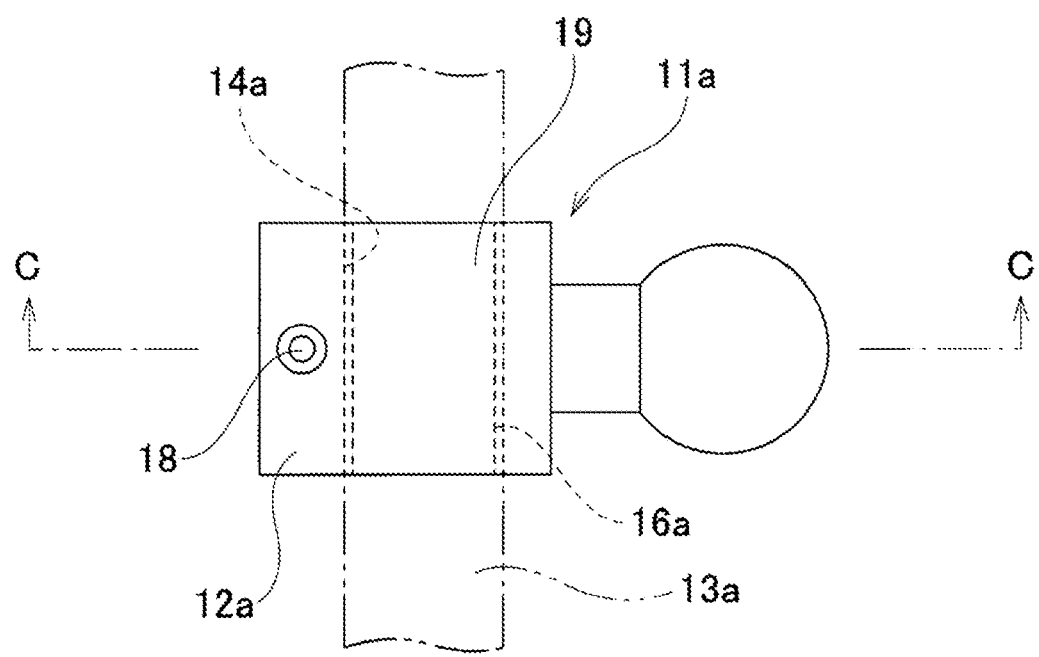
FIG. 10 is a side view illustrating an example of a conventional feed screw mechanism.
Figure 11:
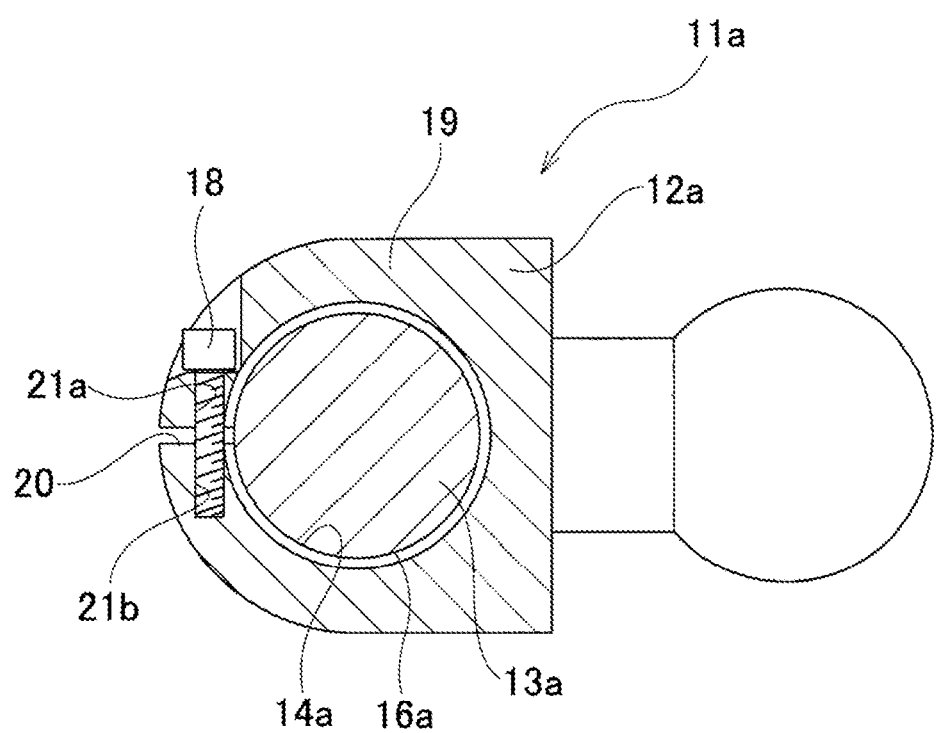
FIG. 11 is a cross-sectional view along section line C-C in FIG. 10.

FIG. 1A to FIG. 4 illustrate a first example of an embodiment of the present invention. The electric position adjustment device for a steering wheel of the present example includes a tilt mechanism for adjusting the vertical position of the steering wheel 9 (see FIG. 9). The electric position adjustment device for a steering wheel includes an electric motor 29, a steering shaft 2a, a steering column 1a, and a feed screw mechanism 11b.

A column bracket 23 for supporting the steering column 1a includes a mounting portion 24 supported and fixed to the vehicle body 22, a front-side support portion 25 that is bent downward from an edge of a side in the width direction of a front-side portion of the mounting portion 24, and a rear-side support portion 26 that is bent downward from an edge on the rear side of the mounting portion 24. A cylindrical sleeve 27 is supported and fixed at an intermediate portion in the vertical direction on the front-side surface of the rear-side support portion 26.

The steering column 1a is entirely formed into a cylindrical shape. The front end portion of the steering column 1a is supported by the front-side support portion 25 of the column bracket 23 so as to be capable of pivotal displacement about a pivot shaft 28 arranged in the width direction of the vehicle body 22.

The steering shaft 2a is rotatably supported on the inner diameter side of the steering column 1a. The steering wheel 9 is supported and fixed to the rear end portion of the steering shaft 2a.

The electric motor 29 and the feed screw mechanism 11b constitutes an electric actuator 3a. The electric motor 29 is supported and fixed to the steering column 1a such that the output shaft 42 is parallel to the axial direction of the steering column 1a. The electric motor 29 has worm teeth 31 on the outer circumferential surface of the output shaft 42.

The feed screw mechanism 11b includes a nut 12b as a fixing member, a rod 13b as a displacement member, and a bolt 18a.

The nut 12b includes a cylindrical portion 19a, a slit 20a, a pair of tightening holes 21c, 21d, and an engaging arm portion 30. The cylindrical portion 19a has a female screw portion 14b on the inner circumferential surface.

The slit 20a is provided at one location in the circumferential direction of the cylindrical portion 19a so as to open to the outer circumferential surface and the inner circumferential surface of the cylindrical portion 19a. In particular, in this example, the slit 20a is arranged not in the axial direction parallel to the center axis of the nut 12b (the cylindrical portion 19a), but is arranged so as to extend in a direction orthogonal to the direction of the lead angle θ (a direction orthogonal to the tooth trace direction) in a portion of the thread grooves of the female screw portion 14b crossed by the slit 20a, as schematically represented (not to scale) in FIG. 2. For this reason, the inner end portion in the radial direction of the slit 20a is open to the inner circumferential surface of the cylindrical portion 19a so as to orthogonally cross the tooth trace of the thread grooves of the female screw portion 14b. The term "orthogonal" refers not only to the case where the angle between the direction of the lead angle θ of the thread grooves of the female screw portion 14b and the extending direction (formation direction, center axis direction) of the slit 20a is 90 degrees, but also includes cases where the angle is near 90 degrees, and more specifically, includes cases where the angle is of about 85 degrees to 95 degrees. Moreover, in this example, the opening width of the slit 20a is substantially constant over the entire length except for inevitable manufacturing errors. (As known in the art, a lead angle θ of a thread form is expressed by $(P/\pi PD)\tan^{-1}$. In the drawings (including FIG. 2), the pitch and pitch diameter of the female screw portions are identified as P and PD, respectively.)

In this example, both end portions in the extending direction of the slit 20a are open to both end surfaces in the axial direction of the cylindrical portion 19a. In other words, the cylindrical portion 19a is formed in a partially cylindrical shape. However, it is also possible that only the end portion on any one side of the slit 20a in the extending direction be open to the end surface in the axial direction of the cylindrical portion 19a.

The slit 20a has, at the inner end portions in the radial direction of a pair of inside surfaces 32 facing each other, a pair of relief portions 33 that are inclined in directions going away from each other while going inward in the radial direction. As a result, as will be described later, in a state where the inner diameter of the cylindrical portion 19a is reduced, the surface pressure of the contact portions between the inner end portions in the radial direction of the inside surfaces 32 and the male screw portion 16b is prevented from becomes excessively large, and concentration of excessive stress at the contact portions is prevented. In this example, the relief portions 33 are constructed by a concave curved surface having an arc-shaped cross section. However, the relief portions 33 may be constructed by a convex curved surface or inclined surface having a linear cross-sectional shape.

A pair of tightening holes 21c, 21d are provided in portions on both sides of the cylindrical portion 19a that are aligned with each other across the slit 20a in a direction orthogonal to the extending direction of the slit 20a; or in other words, the pair of tightening holes 21c, 21d are provided coaxially with each other in a direction parallel to the direction of the lead angle θ in portions of the thread grooves of the female screw portion 14b that are crossed by the slit 20a. More specifically, the pair of tightening holes 21c, 21d are provided in portions on both sides of the cylindrical portion 19a across a central position in the extending direction of the slit 20a. In this example, of the pair of tightening holes 21c, 21d, one of the tightening holes 21c is a circular hole, and the other tightening hole 21d is a screw hole. Note that, in a case where the entire length of the slit 20a is long, a plurality of pairs of tightening holes 21c, 21d may be provided in portions on both sides of the cylindrical portion 19a across the slit 20a.

The engaging arm portion 30 has a spherical portion 34 at the tip-end portion, the outer circumferential surface of which is a spherical convex surface, and the spherical portion 34 is engaged with the inner circumferential surface of the sleeve 27 without any looseness in the radial direction. Accordingly, the nut 12b is supported by the column bracket 23, which is a portion that does not displace in the vertical direction that is the adjustment direction of the steering wheel 9 during adjusting the vertical position of the steering wheel 9. The engaging arm portion 30 is arranged so as to protrude in the radial direction from an outer circumferential surface of a portion of the cylindrical portion 19a that is shifted in the circumferential direction from a portion where the slit 20a is provided. In this example, the engaging arm portion 30 is provided at a position where the phase is shifted by about 120 degrees in the circumferential direction from the portion where the slit 20a is provided. However, for example, the engaging arm portion 30 may be arranged at a position where the phase is shifted by 90 degrees in the circumferential direction from the portion where the slit 20a is provided, or may be arranged at a position on the opposite side in the radial direction of the portion where the slit 20a is provided. The engaging arm portion 30 may be provided integrally with the cylindrical portion 19a, or may be provided by fixing a component separate from the cylindrical portion 19a to the cylindrical portion 19a by welding or the like.

Figure 1:
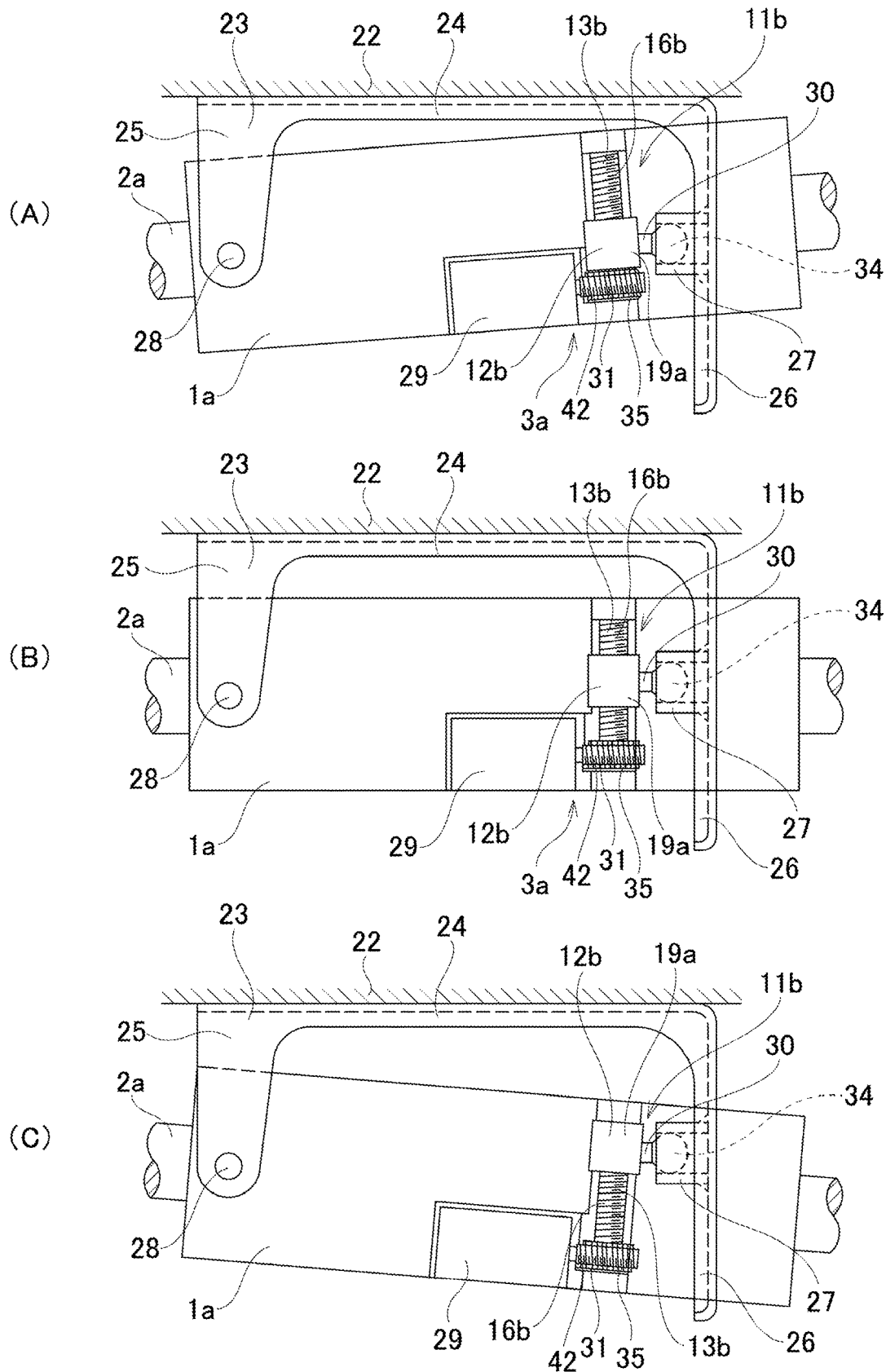
FIG. 1A to FIG. 1C are side views illustrating an electric position adjustment device for a steering wheel according to a first example of an embodiment of the present invention; where

The rod 13b is supported so as to only be able to rotate freely on the side surface in the width direction of the steering column 1a, which is a portion that is displaced in the vertical adjustment direction of the steering wheel 9, together with the steering wheel 9, during adjusting the steering wheel 9 in the vertical direction, in a state in which the center axis of the rod 13b is arranged in a direction orthogonal to the axial direction (direction parallel to the center axis) of the steering column 1a and the width direction of the vehicle body 22 (vertical direction in FIG. 1). The rod 13b has wheel teeth 35 that engage with the worm teeth 31 on the outer circumferential surface of the lower end portion, and has a male screw portion 16b on the outer circumferential surface of the upper portion that screws with the female screw portion 14b. In other words, the rod 13b may be driven and rotated by the electric motor 29.

The bolt 18a is inserted into the one tightening hole 21c that is a circular hole, and the tip end portion is screwed into the other tightening hole 21d that is a screw hole. In other words, in the feed screw mechanism 11b of the present example, the gap of the slit 20a is expanded or contracted by adjusting the amount of tightening (screwing amount) of the bolt 18a with respect to the other tightening hole 21d, making it possible to expand or contract the inner diameter of the cylindrical portion 19a. However, configuration is also possible in which the pair of tightening holes 21c, 21d are both circular holes, and a nut is screwed onto the tip-end portion of the bolt 18a that is inserted through each of the tightening holes 21c, 21d. In any case, by expanding or contracting the inner diameter of the cylindrical portion 19a, the resistance to the relative rotation of the male screw portion 16b with respect to the female screw portion 14b may be suppressed from increasing excessively, and backlash between the female screw portion 14b and the male screw portion 16b may be suppressed.

A method for adjusting the vertical position of the steering wheel 9 in the electric position adjustment device for a steering wheel according to the present example will be described. First, when the steering wheel 9 is displaced upward from, for example, a state as illustrated in FIG. 1B to a state as illustrated in FIG. 1A, the output shaft 42 of the electric motor 29 is driven and rotated in a specified direction by supplying power to the electric motor 29, and the rod 13b is driven and rotated via the engaging portion between the worm teeth 31 and the wheel teeth 35. Rotation of the rod 13b is converted into upward displacement of the rod 13b by screwing of the female screw portion 14b and the male screw portion 16b. When the rod 13b is displaced upward, the rear end portion of the steering column 1a that supports the rod 13b is displaced upward about the pivot shaft 28, and the steering wheel 9 is displaced upward. Note that, with the upward displacement of the steering column 1a, the nut 12b pivots upward around a spherical engaging portion between the spherical portion 34 and the inner circumferential surface of the sleeve 27. After the steering wheel 9 is adjusted to a desired position, the power supply to the electric motor 29 is stopped, the rotation of the rod 13b is stopped, and the position of the steering wheel 9 is maintained.

When the steering wheel 9 is displaced downward, for example, from a state as illustrated in FIG. 1B to a state as illustrated in FIG. 1C, for example, the output shaft 42 of the electric motor 29 is driven and rotated in a direction opposite to the specified direction, and the rod 13b is driven and rotated. Rotation of the rod 13b is converted into downward displacement of the rod 13b by screwing of the female screw portion 14b and the male screw portion 16b. When the rod 13b is displaced downward, the rear end portion of the steering column 1a is displaced downward about the pivot shaft 28, and the steering wheel 9 is displaced downward. Note that, with the downward displacement of the steering column 1a, the nut 12b pivots downward about the spherical engaging portion. After the steering wheel 9 is adjusted to a desired position, the power supply to the electric motor 29 is stopped, the rotation of the rod 13b is stopped, and the position of the steering wheel 9 is maintained.

According to this example, when the amount of tightening of the bolt 18a is increased in order to reduce the inner diameter of the nut 12b, the occurrence of uneven contact between the thread grooves of the female screw portion 14b and the thread peaks of the male screw portion 16b may be suppressed. Therefore, an excessive increase in the resistance to the rotation of the male screw portion 16b relative to the female screw portion 14b may be suppressed, as well as backlash between the female screw portion 14b and the male screw portion 16b may be suppressed. In other words, the slit 20a is provided in the cylindrical portion 19a of the nut 12b so as to extend in a direction orthogonal to the direction of the lead angle θ of the thread grooves in a portion crossed by the slit 20a. Furthermore, the bolt 18a for expanding or contracting the gap of the slit 20a is inserted through or screwed into the pair of tightening holes 21c, 21d provided in a direction orthogonal to the extending direction of the slit 20a. In other words, the bolt 18a is arranged in a direction orthogonal to the extending direction of the slit 20a.

Therefore, when the inner diameter of the cylindrical portion 19a is reduced by increasing the amount of tightening of the bolt 18a with respect to the other tightening hole 21d, the occurrence of uneven contact between the thread grooves of the female screw portion 14b and the thread peaks of the male screw portion 16b may be prevented. In other words, while maintaining the thickness of the gap between a pair of inside surfaces of the thread grooves of the female screw portion 14b and a pair of outside surfaces of the thread peaks of the male screw portion 16b substantially constant, these surfaces may be brought close to each other so that there is slidable contact (surface contact). Therefore, when reducing the inner diameter of the cylindrical portion 19a by increasing the tightening amount of the bolt 18a, the friction acting between the thread grooves of the female screw portion 14b and the thread peaks of the male screw portion 16b may be prevented from becoming large, and the gaps between the thread grooves of the female screw portion 14b and the thread peaks of the male screw portion 16b, which cause backlash, may be suppressed to be small.

Accordingly, when the inner diameter of the cylindrical portion 19a is reduced, an excessive increase in the resistance to the rotation of the male screw portion 16b relative to the female screw portion 14b may be suppressed, as well as backlash between the female screw portion 14b and the male screw portion 16b may be suppressed.

Moreover, in this example, as described above, while keeping the thickness of the gap existing between the pair of inside surfaces of the thread grooves of the female screw portion 14b and the pair of outside surfaces of the thread peaks of the male screw portion 16b substantially constant, these surfaces may be brought close to each other so that there is slidable contact. Therefore, when the bolt 18a is tightened, the amount of displacement in the axial direction of portions on both sides in the radial direction (portions on both sides in the vertical direction of FIG. 2) of the cylindrical portion 19a of the nut 12b may be made smaller than in the structure illustrated in FIG. 12A and FIG. 12B. Therefore, the tightening torque when tightening the bolt 18a may be reduced as compared with the structure illustrated in FIG. 12A and FIG. 12B.

Figure 12:
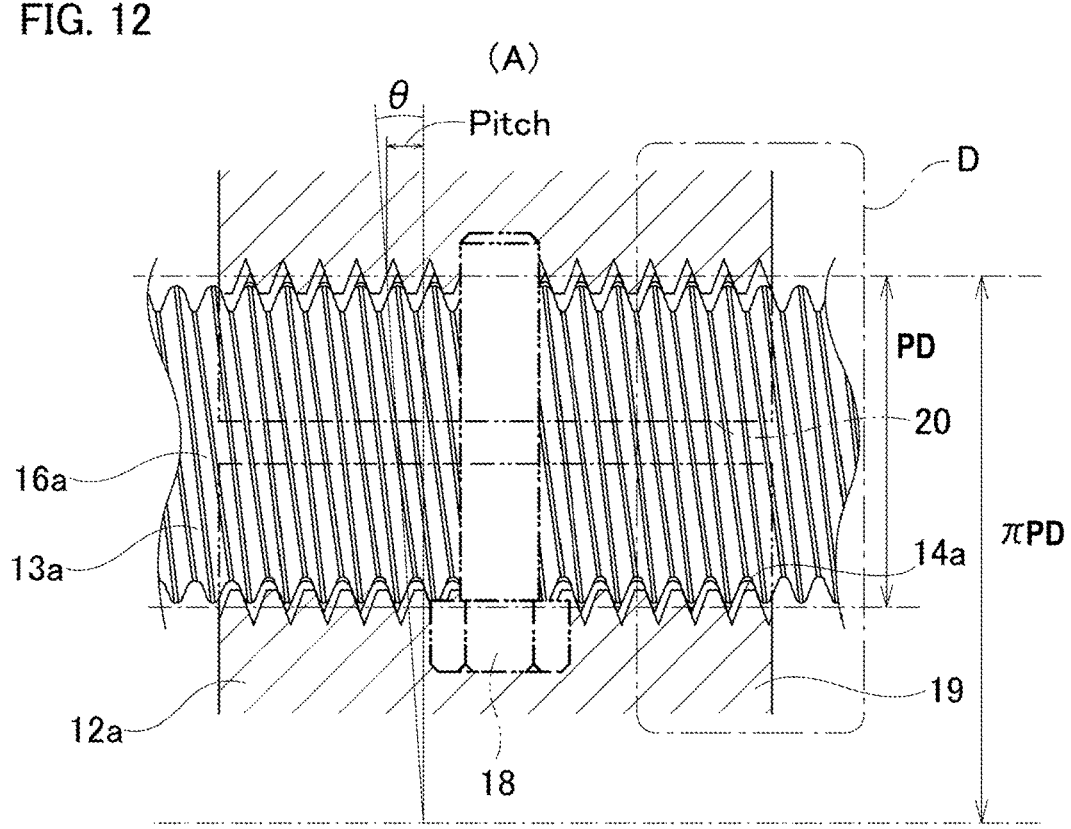
FIG. 12A is a schematic cross-sectional view for explaining a problem of a feed screw mechanism having a conventional structure.
FIG. 12B is an enlarged view of part D in FIG. 12A.
Figure 12:
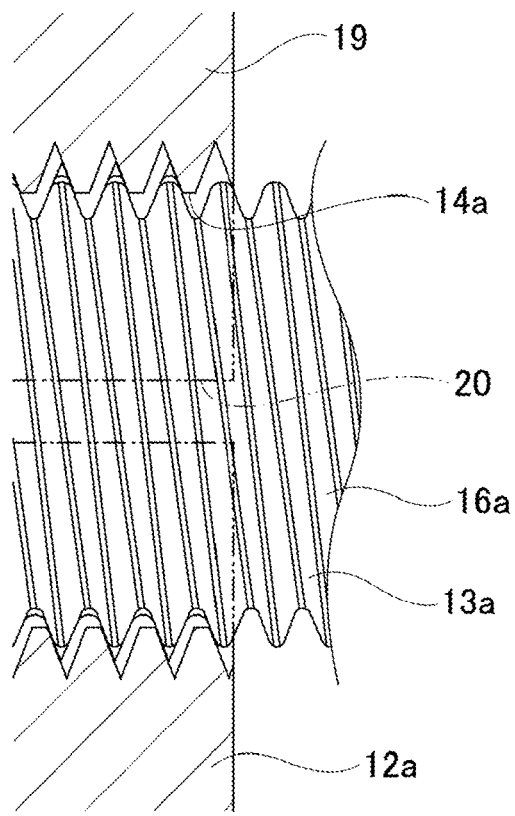

Therefore, the tightening torque of the bolt 18a required to reduce the inner diameter of the cylindrical portion 19a may kept small as compared with the structure illustrated in FIG. 12A and FIG. 12B. Thus, the assembly cost of the feed screw mechanism 11b may be kept low.

Further, as described above, while keeping the thickness of the gap existing between the pair of inside surfaces of the thread grooves of the female screw portion 14b and the pair of outside surfaces of the thread peaks of the male screw portion 16b substantially constant, these surfaces may be brought close to each so that there is surface contact. For this reason, the contact surface pressure between the pair of inside surfaces of the thread grooves of the female screw portion 14b and the pair of outside surfaces of the thread peaks of the male screw portion 16b may be made substantially constant and low. Therefore, together with being able to reduce looseness between the female screw portion 14b and the male screw portion 16b that occurs due to the operation of the feed screw mechanism 11b, the durability of the female screw portion 14b and the male screw portion 16b against looseness may be improved.

Further, the gaps may be adjusted while absorbing single pitch error and accumulated pitch error, so it is not necessary to excessively increase the processing accuracy of the female screw portion 14b and the male screw portion 16b. Therefore, when forming the female screw portion 14b and the male screw portion 16b, the finishing process such as polishing or the like can be omitted, and these screw portions may be formed by only a rolling process. As a result, it is possible to reduce the manufacturing cost of the feed screw mechanism 11b.

Furthermore, in this example, while maintaining the thickness of the gap existing between the pair of inside surfaces of the thread grooves of the female screw portion 14b and the pair of outside surfaces of the thread peaks of the male screw portion 16b substantially constant, these surfaces may be brought close to each other so as to be in slidable contact, so the reaction force applied to the bolt 18a may be reduced as the bolt 18a is tightened. Therefore, the surface pressure between the female screw portion 14b and the male screw portion 16b may be kept low, and the tightening torque of the bolt 18a may be reduced. Accordingly, by finely adjusting the amount of tightening of the bolt 18a, it is possible to widen the range for adjusting looseness existing between the female screw portion 14b and the male screw portion 16b. In other words, the looseness existing between the female screw portion 14b and the male screw portion 16b and the resistance to sliding between the female screw portion 14b and the male screw portion 16b may be easily adjusted in accordance with the performance required for the feed screw mechanism 11b.

In this example, a pair of tightening holes 21c, 21d are provided on both side portions of the cylindrical portion 19a across the central position in the extending direction of the slit 20a. Therefore, regardless of the direction of the relative displacement in the axial direction of the rod 13a with respect to the nut 12b, the torque required to relatively displace the rod 13a with respect to the nut 12b may be stabilized.

In this example, the rod 13b of the feed screw mechanism 11b is configured so as to be able to be driven and rotated by the electric motor 29; however, the nut 12b may be configured so as to be able to be driven and rotated by the electric motor 29. In addition, in this example, when adjusting the vertical position of the steering wheel 9, the nut 12b is supported via the column bracket 23 by a portion of the vehicle body 22 that does not displace in the vertical direction, and the rod 13a is supported by the steering column 1a that displaces in the vertical direction together with the steering wheel 9. However, when adjusting the vertical position of the steering wheel 9, the nut 12b may be supported by a portion that displaces in the vertical direction together with the steering wheel 9, and more specifically, for example, the steering column 1a, the steering shaft 2a, or the like, and the rod 13b may be supported by a portion that does not displace in the vertical direction, and more specifically, for example, the column bracket 23 or the like.

Note that in the present example, the female screw portion 14b and the male screw portion 16b are constructed by a single thread screw; however, they may be configured by a multiple thread screw such as a double thread screw or the like. In this case, the average value of the lead angle θ of the plurality of thread grooves of the female screw portion 14b is obtained, and the slit 20a is formed in a direction shifted by about 90 degrees (about 85 degrees to 95 degrees) with respect to the magnitude of the average value.

Second Example

Figure 5:
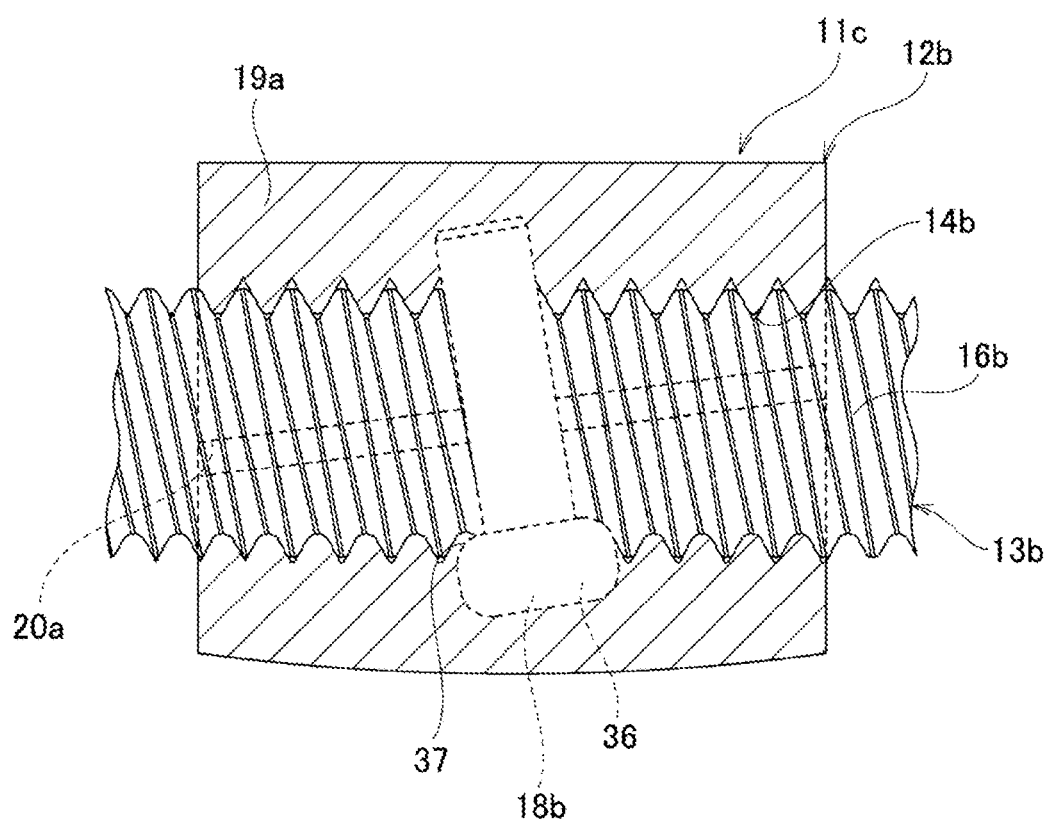
FIG. 5 is a view similar to FIG. 2, and illustrates a second example of an embodiment of the present invention.

FIG. 5 illustrates a second example of an embodiment of the present invention. In the bolt 18b of the feed screw mechanism 11c of the present example, the bearing surface 37 of the head portion 36 is configured by a convex curved surface having an arc-shaped cross-sectional shape. Therefore, it is possible to keep the amount of elastic deformation of the bolt 18b small when increasing the amount of tightening of the bolt 18b and reducing the gap of the slit 20a. In other words, the bending stress acting on the bolt 18b (the shaft portion) via the bearing surface 37 of the head portion 36 may be kept low. As a result, the tightening torque of the bolt 18b may be stabilized, and the engagement allowance between the female screw portion 14b of the nut 12b and the male screw portion 16b of the rod 13b may be easily adjusted.

Not that the portion of the nut 12b that comes into contact with the bearing surface 37 of the bolt 18b may be configured by a flat surface, or may be configured by a concave curved surface having an arc-shaped cross section. The configuration and operational effects of the other parts are the same as those of the first example.

Third Example

Figure 6:
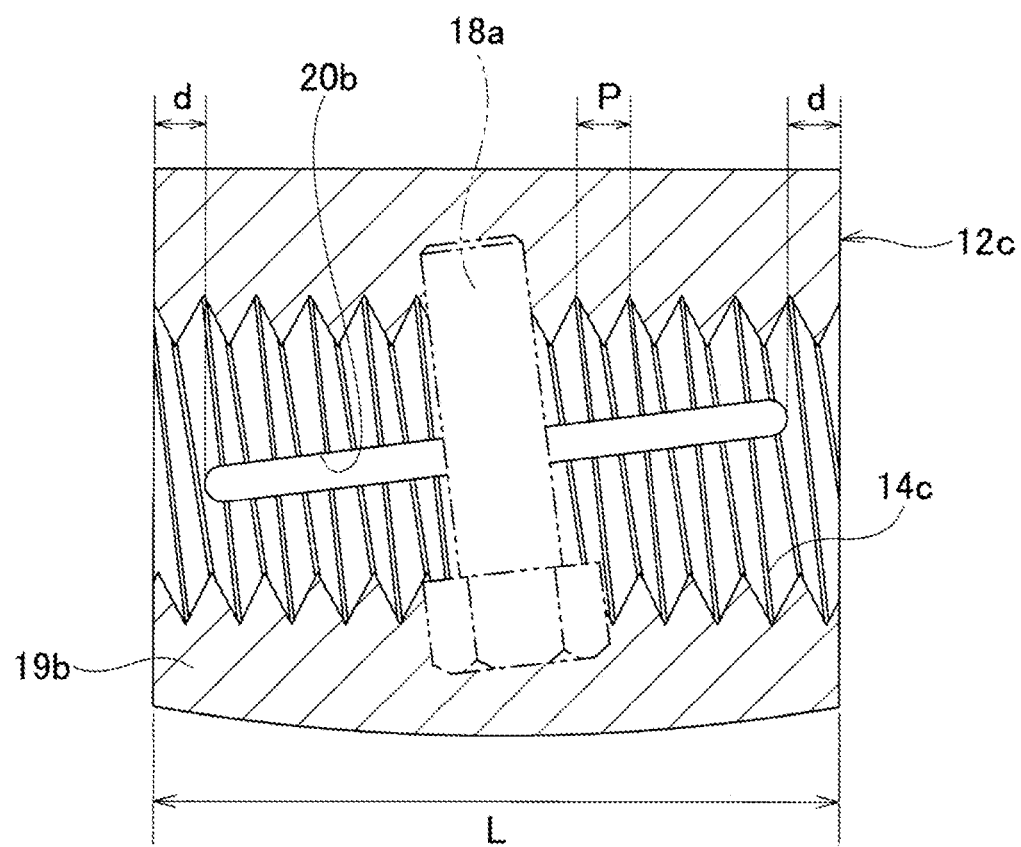
FIG. 6 is a view similar to FIG. 4, illustrating a third example of an embodiment of the present invention.
Figure 7:
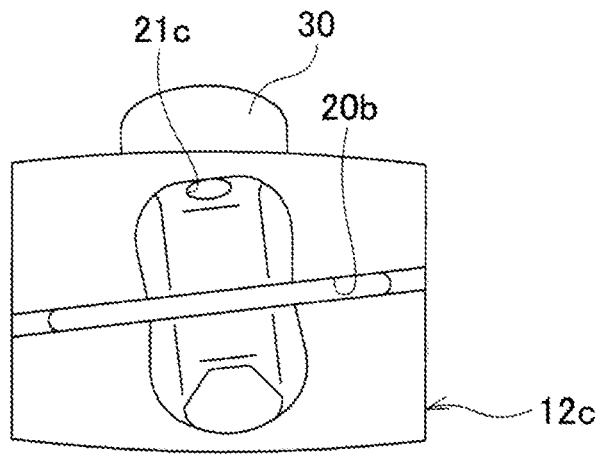
FIG. 7A is a side view of a nut according to the third example as viewed from the outside in the radial direction.
FIG. 7B is a side view as seen from an angle different from FIG. 7A.
Figure 7:
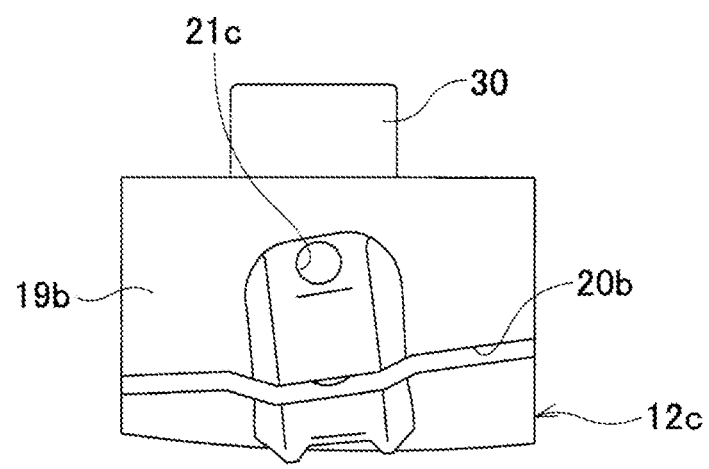

FIG. 6 to FIG. 7B illustrate a third example of an embodiment of the present invention. In this example, both end portions of the nut 12c in the extending direction of the slit 20b do not open to both end surfaces in the axial direction of the cylindrical portion 19b. In other words, in this example, the slit 20b is configured by a long hole. More specifically, as illustrated in FIG. 7A, the inside portions in the radial direction of both end portions in the extending direction of the slit 20b do not open to both end surfaces in the axial direction of the cylindrical portion 19b; however, at the outside portions in the radial direction of both end portions in the extending direction of the slit 20b, cutting marks that occurred when forming the slits 20b by cutting are open to both end surfaces in the axial direction of the cylindrical portion 19b. However, it is also possible to prevent cutting marks from occurring at the outside portions in the radial direction at both ends in the extending direction of the slit 20b. Note that in this example, a pair of tightening holes 21c is provided in both side portions of the cylindrical portion 19b across the central position in the extending direction of the slit 20b.

The interval "d" in the axial direction of the nut 12c between the end portion in the axial direction of the inside portion in the radial direction of the slit 20b and the end surface in the axial direction of the cylindrical portion 19b is preferably no less than 2% and no more than 30% of the dimension "L" in the axial direction of the female screw portion 14c. More specifically, when the nut 12c of the present example is incorporated in a feed screw mechanism of an electric position adjustment device for a steering wheel having a tilt mechanism for a general passenger car, the interval "d" is preferably set to be no less than 15% and no more than 450% of the pitch "P" of the female screw portion 14c.

In this example, the inside portions in the radial direction of both ends in the extending direction of the slit 20b are not open to both end surfaces in the axial direction of the cylindrical portion 19b, so the rigidity of both end portions in the axial direction of the female screw portion 14c of the nut 12c is appropriately maintained, and the engaged state between the female screw portion 14c and the male screw portion 16a of the rod 13b (refer to FIG. 2) can be appropriately maintained in the axial direction. Moreover, note that in this example, a pair of tightening holes 21c is provided in both side portions of the cylindrical portion 19b across the central position in the extending direction of the slit 20b. Therefore, when the gap of the slit 20b is reduced by inserting or screwing the bolt 18a into the pair of tightening holes 21c, 21d, the moments about the both end portions of the slit 20b as fulcrums may be increased, so the diameter of the cylindrical portion 19b may efficiently reduced, and the torque required for adjusting the engagement allowance between the female screw portion 14c and the male screw portion 16b of the rod 13b (see FIG. 2) may be reduced. Moreover, regardless of the direction of the relative displacement in the axial direction of the rod 13b with respect to the nut 12c, the torque required to relatively displace the rod 13b with respect to the nut 12c may be stabilized. The configuration and operational effects of the other parts are the same as those of the first example.

Fourth Example

Figure 8:
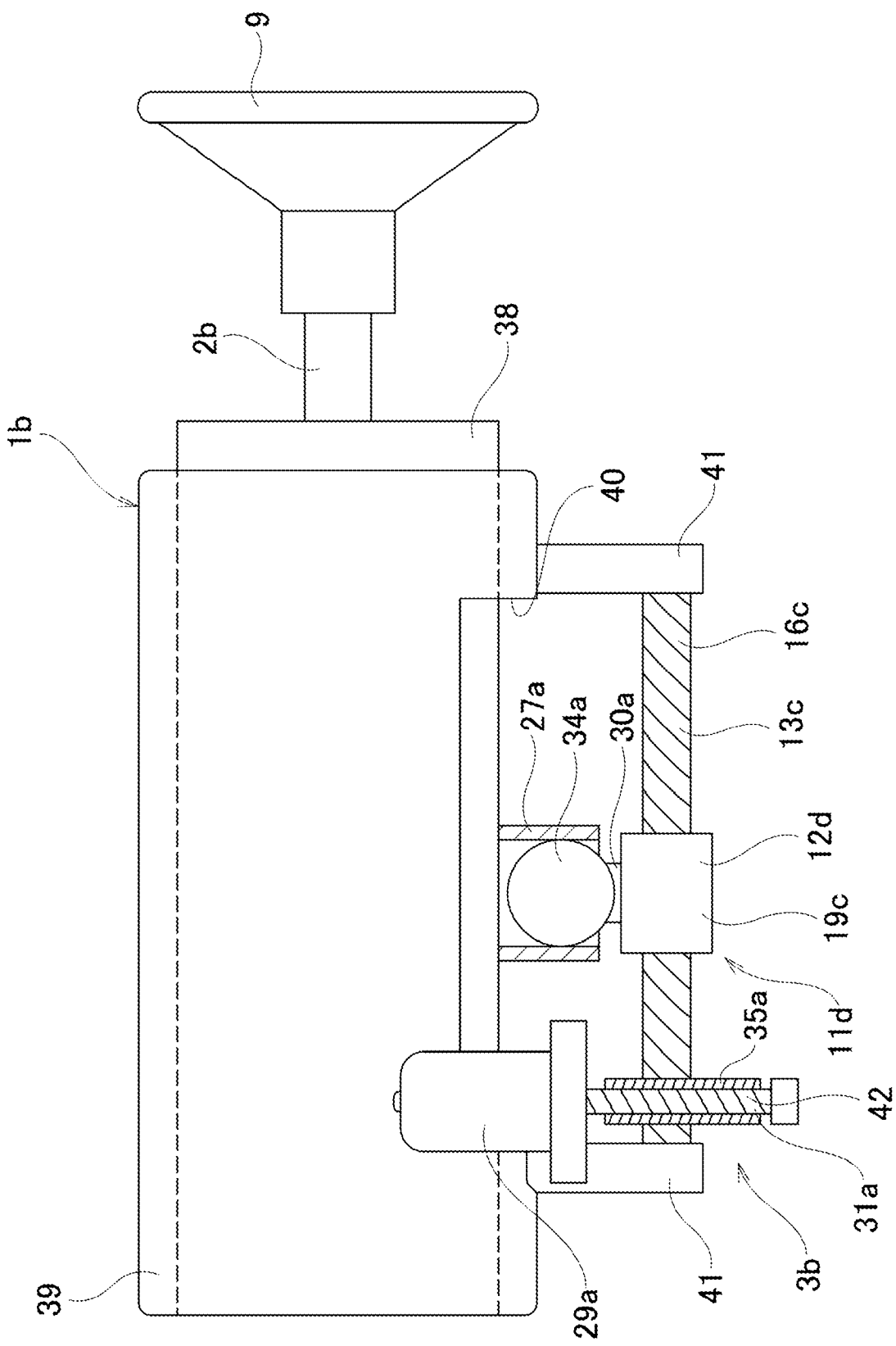
FIG. 8 is a side view illustrating an electric position adjustment device for a steering wheel according to a fourth embodiment of the present invention.

FIG. 8 illustrates a fourth example of an embodiment of the present invention. The electric position adjustment device for a steering wheel according to this example includes a telescopic mechanism for adjusting the front-rear position of the steering wheel 9. The electric position adjustment device for a steering wheel according to this example includes an electric motor 29, a steering shaft 2b, a steering column 1b, and a feed screw mechanism 11b.

The steering column 1b is configured by combining an inner column 38 and an outer column 39 so that the entire length may be extended or contracted. The outer column 39 has a through hole 40 at one location in the circumferential direction that is open to the outer circumferential surface and the inner circumferential surface of the outer column 39 and extends in the axial direction. The outer column 39 is supported by the vehicle body so as not to be able to be displaced in the axial direction. A cylindrical sleeve 27a is supported and fixed to a portion of the outer circumferential surface of an intermediate portion of the inner column 38 that is exposed inside the through hole 40 of the outer column 39.

The steering shaft 2b is configured by combining an inner shaft and an outer tube so that the entire length may be extended or contracted, and so that torque may be transmitted. The steering shaft 2b is rotatably supported on the inner diameter side of the steering column 1b. A steering wheel 9 is supported at the rear end portion of the steering shaft 2b.

The electric actuator 3b is configured by the electric motor 29a and the feed screw mechanism 11d. The electric motor 29a is supported and fixed to the steering column 1b so that the output shaft 42 shaft is arranged in a direction orthogonal to the axial direction of the steering column 1b and the width direction of the vehicle body. The electric motor 29a has worm teeth 31a on the outer circumferential surface of the output shaft 42.

Figure 2:
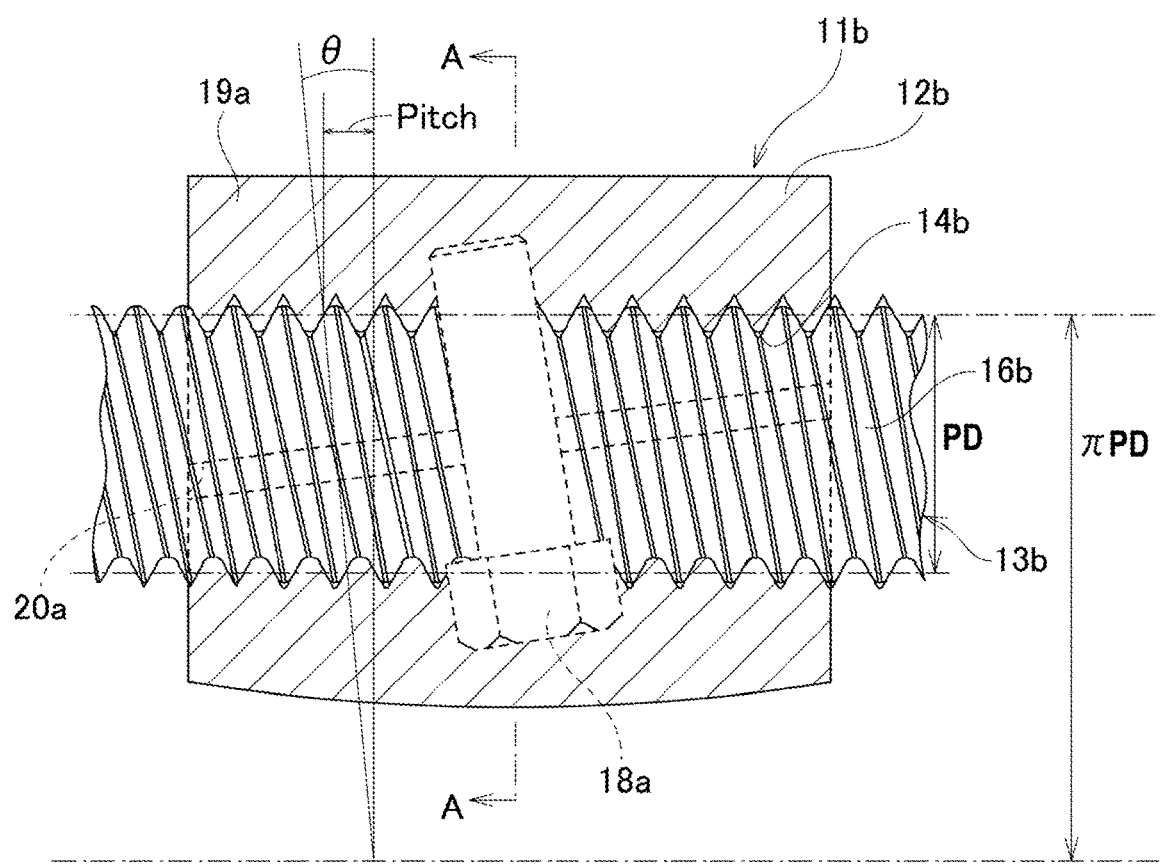
FIG. 2 is a schematic cross-sectional view illustrating a feed screw mechanism according to the first example.
Figure 3:
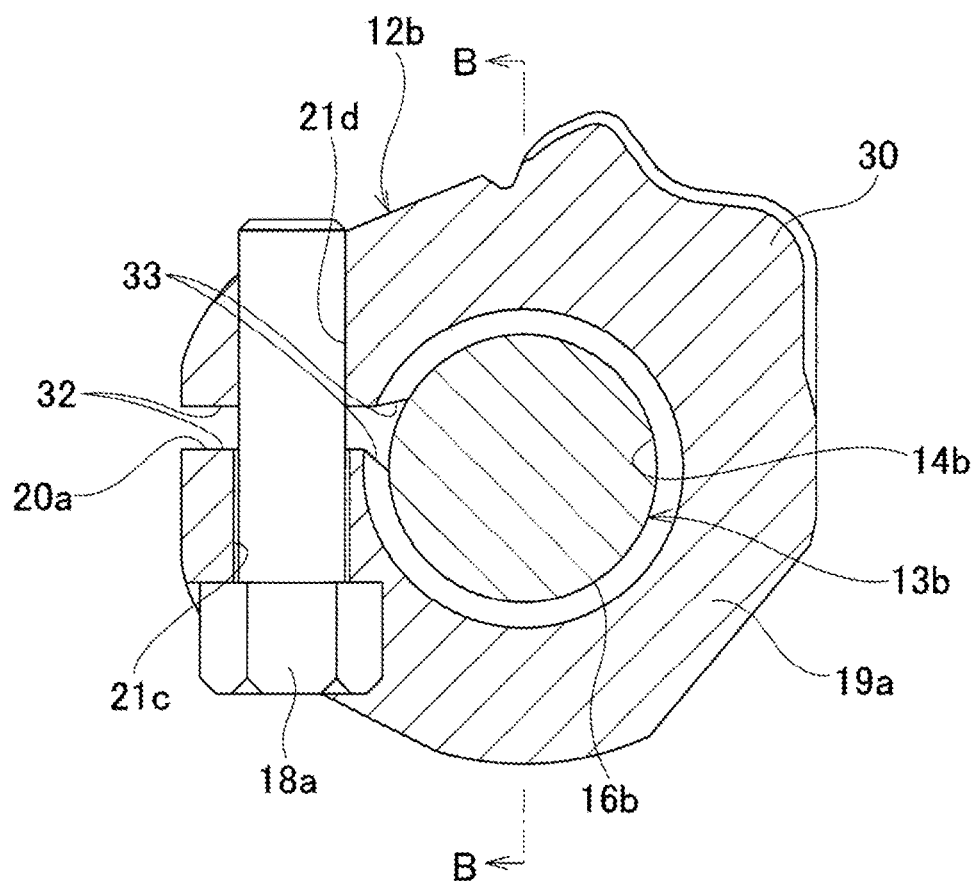
FIG. 3 is a cross-sectional view taken along section line A-A in FIG. 2.
Figure 4:
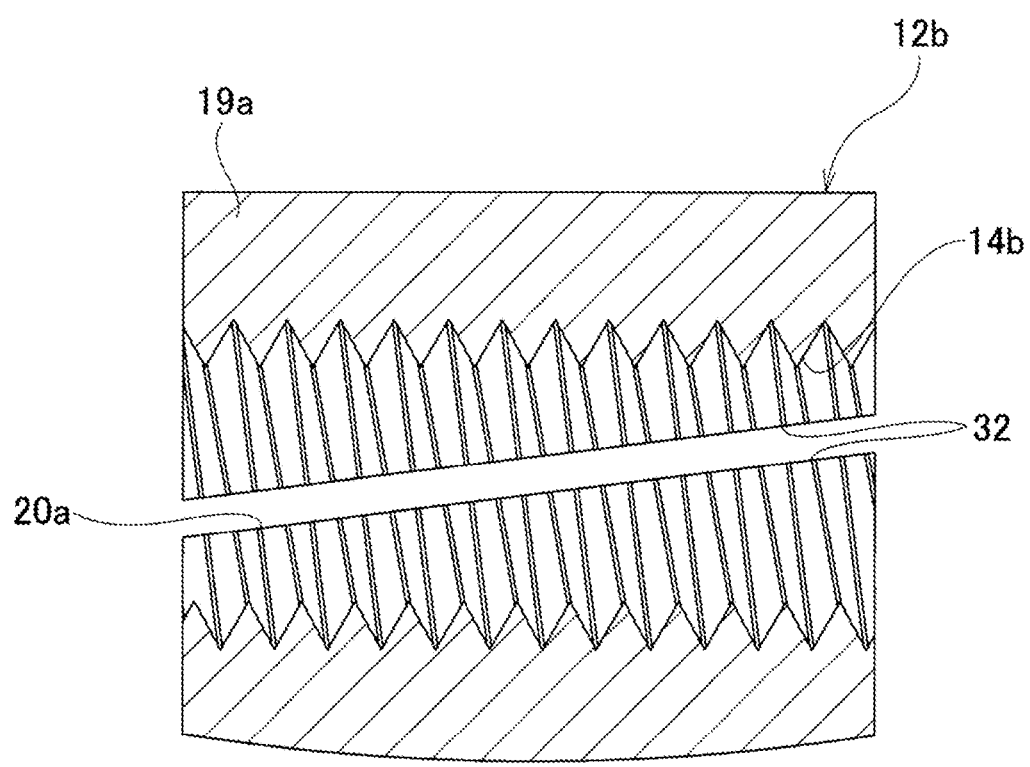
FIG. 4 is a cross-sectional view taken along section line B-B in FIG. 3, and illustrates the removed nut.

The feed screw mechanism 11d includes a nut 12d as a displacement member, a rod 13c as a fixing member, and a bolt 18a (see FIG. 2 and FIG. 3).

The nut 12d includes a cylindrical portion 19c, a slit 20a (see FIG. 2 to FIG. 4), a pair of tightening holes 21c, 21d (see FIG. 3), and an engaging arm portion 30a.

The cylindrical portion 19c has a female screw portion 14b (see FIG. 2 to FIG. 4) on the inner circumferential surface. The slit 20a is provided at one location in the circumferential direction of the cylindrical portion 19c so as to extend in a direction orthogonal to the direction of the lead angle θ in a portion of the thread grooves of the female screw portion 14b that is crossed by the slit 20a. The pair of tightening holes 21c, 21d are provided coaxially with each other in portions of the cylindrical portion 19c on both sides aligned with each other across the slit 20a and in a direction orthogonal to the extending direction of the slit 20a.

The engaging arm portion 30a has a spherical portion 34a having an outer circumferential surface that is a spherical convex surface on the tip end portion, and the spherical portion 34a is engaged with the inner circumferential surface of the sleeve 27a supported and fixed to the inner column 38 without looseness in the radial direction. As a result, when adjusting the front-rear position of the steering wheel 9, the nut 12d is supported by the inner column 38 that is a portion that displaces together with the steering wheel 9 in the front-rear direction as the adjustment direction of the steering wheel 9.

When adjusting the front-rear position of the steering wheel 9 in a state in which the center axis of the rod 13c is arranged in a direction parallel to the center axis of the steering column 1b, the rod 13c is supported by the outer column 39 as a portion that does not displace in the front-rear direction adjustment direction of the steering wheel 9 so as only to be able to freely rotate. In other words, both end portions in the axial direction of the rod 13c are rotatably supported via bearings (not illustrated) by a pair of support arm portions 41 that protrude from portions of the outer circumferential surface of the outer column 39 that are adjacent to the through hole 40 in the axial direction. The rod 13c, on the outer circumferential surface of the front end portion, has wheel teeth 35a that engage with the worm teeth 31a, and on the outer circumferential surface, has a male screw portion 16c that screws with the female screw portion 14b. In other words, the rod 13c may be driven and rotated by the electric motor 29a.

The bolt 18a is inserted into the one tightening hole 21c that is a circular hole, and the tip end portion is screwed into the other tightening hole 21d that is a screw hole. In other words, by adjusting the amount of tightening of the bolt 18a with respect to the other tightening hole 21d, the gap of the slit 20a can be expanded or contracted, and the inner diameter of the cylindrical portion 19c may be expanded or contracted.

In the electric position adjustment device for a steering wheel of this example, when adjusting the front-rear position of the steering wheel 9, by supplying power to the electric motor 29a, the output shaft 42 of the electric motor 29a is driven and rotated, and via the engaging portion of the worm teeth 31a and the wheel teeth 35a, the rod 13c is rotated and driven. Rotation of the rod 13c is converted into axial displacement of the nut 12d by screwing the female screw portion 14b with the male screw portion 16c. When the nut 12d is displaced in the axial direction, the inner column 38 connected to the nut 12d via the engaging arm portion 30a and the sleeve 27a is displaced in the axial direction relative to the outer column 39, and the steering wheel 9 is displaced in the front-rear direction. After the steering wheel 9 is adjusted to a desired position, the power supply to the electric motor 29a is stopped, the rotation of the rod 13c is stopped, and the position of the steering wheel 9 is maintained.

In the case of this example as well, the slit 20a is provided in the cylindrical portion 19c of the nut 12d so as to extend in a direction orthogonal to the direction of the lead angle θ of the thread grooves at the portion where the slit 20a crosses, so when increasing the amount of tightening of the bolt 18a in order to reduce the inner diameter of the nut 12d, it is possible to suppress the occurrence of uneven contact between the thread grooves of the female screw portion 14b and the thread peaks of the male screw portion 16c. The configuration and operational effects of the other parts are the same as those of the first example.

The structure of each example of the above embodiment described above may be appropriately combined and implemented as long as no contradiction occurs. More specifically, for example, the tilt mechanism of the first example and the telescopic mechanism of the fourth example may be simultaneously provided. In addition, the feed screw mechanism of the present invention is not limited to an electric position adjustment device for a steering wheel, and, for example, may be used for various mechanical devices such as machine tools and the like.

REFERENCE SIGNS LIST 1, 1a, 1b Steering column
2, 2a, 2b Steering shaft
3, 3a, 3b Electric actuator
4 Outer column
5 Inner column
6 Inner shaft
7 Outer tube
8 Bearing
9 Steering wheel
10 Housing
11, 11a, 11b, 11c, 11d Feed screw mechanism
12, 12a, 12b, 12c Nut
13, 13a, 13b, 13c Rod
14, 14a, 14b, 14c Female screw portion
15 Worm reducer
16, 16a, 16b, 16c Male screw portion
17 Arm portion
18, 18a, 18b Bolt
19, 19a, 19b, 19c Cylindrical portion
20, 20a, 20b Slit
21a, 21b, 21c, 21d Tightening holes
22 Vehicle body
23 Column bracket
24 Mounting portion
25 Front-side support portion
26 Rear-side support portion
27, 27a Sleeve
28 Pivot shaft
29, 29a Electric motor
30, 30a Engaging arm portion
31 Worm teeth
32 Inside surface
33 Relief portion
34 Spherical portion
35 Wheel teeth
36 Head portion
37 Bearing surface
38 Inner column
39 Outer column
40 Through hole
41 Support arm portion
42 Output shaft
$\theta$ Lead angle
PD Pitch diameter

The invention claimed is:
1. A nut comprising:
a cylindrical portion having a female screw portion provided with spiral shaped thread grooves on an inner circumferential surface thereof; and
a slit provided at one location in a circumferential direction of the cylindrical portion and opening to an outer circumferential surface and an inner circumferential surface of the cylindrical portion;
the slit extending in an extending direction orthogonal to a direction of a lead angle $\theta$ in a portion of the thread grooves crossed by the slit.

2. The nut according to claim 1, wherein both end portions in the extending direction of the slit are not open to both end surfaces in an axial direction of the cylindrical portion.

3. The nut according to claim 1, wherein the female screw portion is constructed by a multiple thread screw.

4. The nut according to claim 1, wherein a pair of relief portions extending in directions going away from each other while going inward in a radial direction are provided at inner end portions in the radial direction of a pair of inside surfaces of the slit facing each other.

5. The nut according to claim 1, wherein a pair of tightening holes extending in a direction orthogonal to the extending direction of the slit are provided at portions on both sides of the cylindrical portion aligned with each other across the slit.

6. The nut according to claim 5, wherein the pair of tightening holes is provided at the positions on both side of the cylindrical portion across a central position in the extending direction of the slit.

7. A feed screw mechanism, comprising:
a nut including a cylindrical portion having a female screw portion provided with spiral shaped thread grooves on an inner circumferential surface thereof; a slit provided at one location in a circumferential direction of the cylindrical portion and opening to an outer circumferential surface and an inner circumferential surface of the cylindrical portion; and a pair of tightening holes provided at portions on both sides of the cylindrical portion aligned with each other across the slit and extending in a direction orthogonal to an extending direction of the slit;
a rod having a male screw portion on an outer circumferential surface thereof that screws with the female screw portion; and
a bolt inserted though or screwed in the pair of tightening holes for expanding or contracting a gap of the slit;
wherein the nut is constructed by the nut according to claim 5.

8. The feed screw mechanism according to claim 7, wherein a bearing surface of the head portion of the bolt is configured by a convex curved surface.

9. An electric position adjustment device for a steering wheel, comprising:
an electric motor having an output shaft;
a steering shaft with a steering wheel supported at a rear end portion thereof;
a steering column in which the steering shaft is rotatably supported on an inner diameter side thereof; and
a feed screw mechanism including:
a nut including a cylindrical portion on an inner circumferential surface having a female screw portion provided with spiral shaped thread grooves; a slit provided at one location in the a circumferential direction of the cylindrical portion and opening to an outer circumferential surface and an inner circumferential surface of the cylindrical portion; a pair of tightening holes provided at portions on both sides of the cylindrical portion aligned with each other across the slit and extending in a direction orthogonal to an extending direction of the slit;
a rod having a male screw portion on an outer circumferential surface thereof that screws with the female screw portion; and a bolt that is inserted though or screwed in the pair of tightening holes for expanding or contracting a gap of the slit;
wherein
the feed screw mechanism is constructed by the feed screw mechanism according to claim 7;
the nut or the rod is supported so as to be able to be driven and rotated by the output shaft; and
a displacement member that is one of the nut and the rod is supported by a portion that displaces in an adjustment direction of the steering wheel together with the steering wheel when adjusting the position of the steering wheel, and a fixing member that is the other of the nut and the rod is supported by a portion that does not displace in the adjustment direction of the steering wheel when adjusting the position of the steering wheel.

\* \* \* \* \*